US007696473B2

(12) United States Patent
Quidant et al.

(10) Patent No.: US 7,696,473 B2
(45) Date of Patent: Apr. 13, 2010

(54) METHOD OF OPTICAL MANIPULATION OF SMALL-SIZED PARTICLES

(75) Inventors: Romain Roger Quidant, Barcelona (ES); Maurizio Righini, Barcelona (ES)

(73) Assignees: Institut De Ciencies Fotoniques, Fundacio Privada, Barcelona (ES); Institucio Catalana De Recerca I Estudis Avancats, Barcelona (ES)

( * ) Notice: Subject to any disclaimer, the term of this patent is extended or adjusted under 35 U.S.C. 154(b) by 138 days.

(21) Appl. No.: 11/946,966

(22) Filed: Nov. 29, 2007

(65) Prior Publication Data

US 2008/0212179 A1 Sep. 4, 2008

(30) Foreign Application Priority Data

Dec. 1, 2006 (EP) ................................. 06125242

(51) Int. Cl.
*H01S 1/00* (2006.01)
*H01S 3/00* (2006.01)
*H05H 3/02* (2006.01)

(52) U.S. Cl. ...................................................... 250/251

(58) Field of Classification Search ................. 250/251, 250/492.1

See application file for complete search history.

(56) References Cited

U.S. PATENT DOCUMENTS 5,842,787 A * 12/1998 Kopf-Sill et al. ............ 366/340
7,612,355 B2 * 11/2009 Wu et al. ............... 250/559.04
2002/0121443 A1 * 9/2002 O'Connell .................. 204/547
2004/0051034 A1 * 3/2004 Grier et al. .................. 250/251
2004/0115830 A1 * 6/2004 Touzov ....................... 250/251
2004/0211659 A1 * 10/2004 Velev ......................... 204/164

FOREIGN PATENT DOCUMENTS

JP 2002122600 4/2002

OTHER PUBLICATIONS

European Search Report and Annex to the European Search Report, dated Jul. 5, 2007, for the corresponding European application No. 06-12-5242.

Romain Quidant, et. al., "Radiation forces on a Rayleigh dielectric sphere in a patterned optical near field", Optics Letters, May 1, 2005, pp. 1009-1011, vol. 30, No. 9, Optical Society of America, USA.

(Continued)

*Primary Examiner*—Jack I Berman
*Assistant Examiner*—Brooke Purinton
(74) *Attorney, Agent, or Firm*—Katten Muchin Rosenman LLP

(57) ABSTRACT

Method and system of optical manipulation of micrometer-sized objects, which comprises the steps of placing a pattern (2) of a certain material on a surface (1), wherein said material is capable of sustaining surface plasmons; placing a solution (4) comprising micrometer-sized objects in contact with said surface (1) and said pattern (2); applying at least one optical beam (5) at a certain wavelength and with a certain incident angle (Φ) to said surface (1) for certain time interval, thereby creating surface plasmons forces at said surface (1), in such a way that said micrometer-sized objects are trapped by the pattern (2) in a stable and selective way. Optical trap and use thereof as a tool for optically driven lab-on-a-chip.

23 Claims, 3 Drawing Sheets

OTHER PUBLICATIONS

Giovanni Volpe, et. al., "Surface Plasmon Radiation Forces", Physical Review Letters, Jun. 16, 2006, pp. 238101/1-4, vol. 96, No. 23, The American Physical Society, USA.

V. Garces-Chavez, et. al., "Extended organization of colloidal microparticles by surface plasmon polariton excitation", Physical Review B, Feb. 15, 2006, pp. 085417/1-5, vol. 73, No. 8, The American Physical Society, USA.

Young Gon Song, et. al., "Force of surface plasmon-coupled evanescent fields on Mie particles", Optics Communications, Oct. 15, 2001, pp. 7-19, vol. 198, No. 1-3, Elsevier Science B.V., Netherlands.

"Nippon Laser Denshi KK", Database WPI Week 200258, AN 2002-541722 & JP 2002-122600 A, Apr. 26, 2002, Derwent Publications Ltd., London, GB.

* cited by examiner

METHOD OF OPTICAL MANIPULATION OF SMALL-SIZED PARTICLES

FIELD OF THE INVENTION

The present invention relates to optical manipulation and, more particularly, to the use of optical forces to manipulate small-sized objects with light.

STATE OF THE ART

Optical tweezers use light to manipulate microscopic objects. The optical forces from a focused laser beam are able to trap small particles. In the biological sciences, these instruments have been used to apply forces in the pN-range and to measure displacements in the nm range of objects ranging in size from 10 nm to over 100 mm.

The most basic form of an optical trap is achieved by focussing a laser beam by a high-quality microscope objective to a spot in the specimen plane. This spot creates an "optical trap" which is able to hold a small particle at its center. The light-particle interaction makes the particle feel two types of forces. On the one hand, the gradient forces tend to maintain the particle toward the focus of the laser beam where the field intensity is maximum. On the other hand, the scattering forces tend to push the particle along the incident k-vector (the illumination direction) and therefore go against trapping. Consequently, the successful trapping of an object relies on a suitable design of the optical trap in such a way the gradient forces along the three dimensions dominate the scattering forces.

Most frequently, optical tweezers are built by modifying a standard optical microscope. These instruments have evolved from simple tools to manipulate micron-sized objects to sophisticated devices under computer-control that can measure displacements and forces with high precision and accuracy.

Optical tweezers have been used to trap dielectric spheres, viruses, bacteria, living cells, organelles, small metal particles, and even strands of DNA. Applications include confinement and organization (e.g. for cell sorting), tracking of movement (e.g. of bacteria), application and measurement of small forces, and altering of larger structures (such as cell membranes).

In practice, optical tweezers are very expensive, custom-built instruments. These instruments usually start with a commercial optical microscope but add extensive modifications.

While optical tweezers are expected to be a major element for the elaboration of future integrated lab-on-a-chip devices entirely operated with light, they still suffer from three major limitations: (i) Current traps are 3D and their formation requires a microscope with a high numerical aperture objective lens, making them incompatible with integration, (ii) The minimum incident light power requires powerful lasers and (iii) Because the trapping volumes are limited by diffraction to about one micrometer cube, they do not permit an accurate manipulation of nanometer objects since their Brownian fluctuations exceed the restoring gradient optical forces.

The transposition from 3D to 2D is rendered possible by exploiting evanescent fields bound at interfaces. The experimental observation of solid micrometer-sized dielectric and metallic particles manipulation in an extended homogeneous evanescent field (which should be understood in this case as not-strongly focused by a microscope objective lens) has been reported both at the surface of a prism illuminated under total internal reflection and on top of an optical waveguide. However, in these two cases, because the scattering force pushes the particle along the incident in-plane wave vector, a homogeneous surface wave from a non-focused illumination does not permit stable trapping but results in guiding of the illuminated object along the surface.

In order to extend the range of in-plane optical manipulation, it has lately been proposed to use Surface Plasmons (SP) resonances sustained by the interface between a dielectric and a medium with a negative dielectric function. Depending of the geometry and the dimensions of the metal system, two types of SP are currently known. Surface Plasmons Polaritons (SPP) are surface modes sustained at the interface between a flat extended metal surface (extended over an area with dimensions bigger than the incident wavelength of light) and a dielectric. They correspond to a resonant oscillation of surface charges with an external p-polarized electromagnetic field. SPP resonances lead to a multifold enhanced surface field (enhanced with respect to the incidence) which decays exponentially away from the metal surface. Due to their evanescent nature, the coupling of light to a SPP mode requires specific illumination conditions. This is usually achieved according to the Kreitchmann configuration, by using the total reflection of a laser beam at the surface of a glass prism. An object or particle approaching a metal surface where Surface Plasmons Polaritons (SPP) are excited is subject to SPP forces resulting from the strong field enhancement at the metal/solution interface. It is to be noted that depending on the density of metal and the incident intensity of light, the particles or objects can also be exposed to thermal forces associated to the metal heating. FIG. 1 shows that in the case of a homogeneous gold layer illuminated under SPP resonance conditions, polystyrene colloids get attracted towards the center of the illumination beam to form a compact ensemble. In this case, the self-agglomeration of the colloids is due to combination of thermal and optical forces. Furthermore, under this configuration, the colloids can not be trapped individually to a precise and predefined location.

When the metal area is scaled down to formed a 3D nanostructure, much smaller than the incident wavelength of light, the concept of SP becomes different. Subwavelength metallic nanostructures sustained the so-called Localized Surface Plasmons (LSP). LSP resonances are associated to the metal charges polarization across the nanostructure when located in an electromagnetic field. They are not limited to p-polarized light like SPP and can be coupled directly by a laser beam without the use of the Kreitchmann configuration. They generally lead to a significantly smaller field enhancement compared to SPP.

It has recently been suggested the use of LSP to trap sub-micrometer-sized objects at a surface patterned with a periodic array of gold nanostructures (Quidant et al in "Radiation forces on a Rayleigh dielectric sphere in a patterned optical near field", May 1, 2005/Vol. 30, N° 9/Optics Letters). However, this document shows that stable trapping can not be achieved above a single gold nanostructure. The Rayleigh sphere can only be trapped in between the gold nanostructures, exploiting a collective effect based on the in-plane interferences between the LSP fields. Besides, this document further shows that trapping a single nanosphere requires high incident field intensity (a factor 100 times higher compared to conventional optical tweezers).

Therefore, current methods of trapping small-sized particles or objects by means of optical manipulation do not achieve stable trapping of single object at predefined, controlled locations.

SUMMARY OF THE INVENTION

It is an object of the present invention to provide a method of optical manipulation of micrometer-sized objects based on surface plasmons (SP) which provides stable and selective trapping of micrometer-sized objects at a controlled and predefined location.

According to an aspect of the present invention, there is provided a method of optical manipulation of micrometer-sized objects with the following steps: placing a pattern of a certain material on a surface, wherein that material is capable of sustaining surface plasmons; placing a solution comprising micrometer-sized objects in contact with the surface and the pattern; applying at least one optical beam at a certain wavelength and with a certain incident angle to the surface for a certain time interval, thereby creating surface plasmons forces at the surface in such a way that the micrometer-sized objects are selectively trapped by the pattern in a stable way.

The pattern can be formed by at least one item made of the material or by several items (an array of items) made of the material, the item or items being capable of trapping at least one micrometer-sized object in a stable way. If the pattern is formed by several items, they are separated between each other by a distance which is bigger than the wavelength of the incident optical beam.

The surface plasmons are preferably surface plasmons polaritons.

The material forming the pattern is preferably a metal.

The items forming the pattern preferably take the form of a stripe or of a disk.

The surface is preferably illuminated under total internal reflection through a transparent element.

The intensity at the surface (1) provided by the optical beam (5) is lower than $10^7$ W/m$^2$.

It is a further object of the invention to provide a system for carrying out the method of optical manipulation and trapping. Thus, it is an object of the present invention to provide a system for optically manipulating micrometer-sized objects which comprises: a surface on which a pattern of a certain material is placed, wherein the material is capable of sustaining surface plasmons; a solution comprising micrometer-sized objects, the solution being in contact with the surface and the pattern; an optical source capable of emitting at least one optical beam at a certain wavelength, polarization and with a certain incident angle towards the surface, the optical beam being capable of illuminating the surface, pattern and solution for a certain time interval, thereby creating surface plasmons forces at the surface, in such a way that the micrometer-sized objects are selectively trapped by the pattern in a stable way.

According to another aspect of the present invention, there is provided an optical trap for trapping micrometer-sized objects which comprises a pattern of a certain material placed on a surface, the pattern being formed by at least one item of the material, the at least one item being capable of trapping in a stable and selective way at least one micrometer-sized object comprised in a solution, the solution being in contact with the pattern and the surface, by means of surface plasmon forces created on the surface as a result of an optical beam illuminating the pattern and the surface.

Finally, another aspect of the invention relates to the use of an optical trap as a tool for optically driven lab-on-a-chip.

Additional advantages and features of the invention will become apparent from the detail description that follows and will be particularly pointed out in the appended claims.

BRIEF DESCRIPTION OF THE DRAWINGS

In order to provide for a better understanding of the invention, a set of drawings is provided, which should not be interpreted as restricting the scope of the invention, but just as an example of how the invention can be embodied. The drawings comprise the following figures.

DESCRIPTION OF PREFERRED EMBODIMENTS OF THE INVENTION

In this text, the term “comprises” and its derivations (such as “comprising”, etc.) should not be understood in an excluding sense, that is, these terms should not be interpreted as excluding the possibility that what is described and defined may include further elements, steps, etc.

In the context of the present invention, the term “approximately” and terms of its family (such as “approximate”, etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms “about” and “around”.

In the context of the present invention, the term “micrometer-sized particles” is to be understood as comprising particles whose size varies between approximately 1 μm and approximately 100 μm.

Besides, in the context of the present invention, the term “object” is to be understood as having the same meaning as “particle”.

Furthermore, in the context of the present invention, the expression “stable trapping” means that an object is trapped by an optical trap (such as an item forming a pattern) in a fixed location for a significant period of time.

Finally, in the context of the present invention, the term “lab-on-a-chip” is to be understood as a term for devices that integrate multiple laboratory functions on a single chip or substrate of a few millimetres or centimetres in size and that are capable of handling extremely small fluid volumes.

Figure 1:
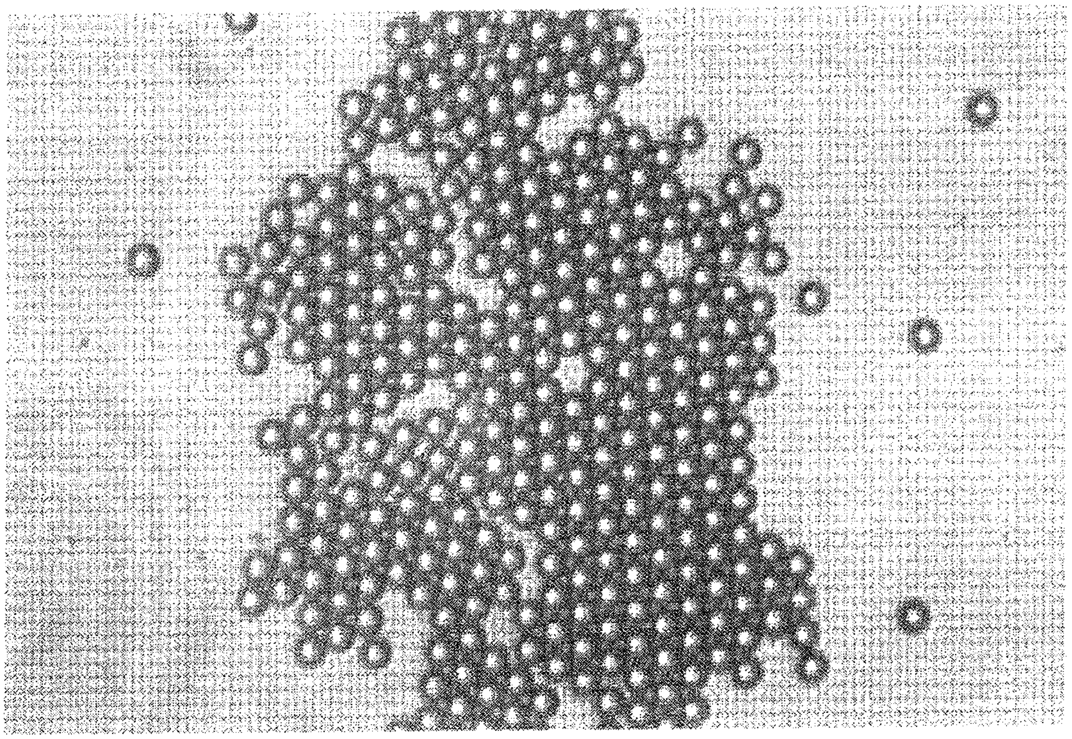
PRIOR ART FIG. 1
FIG. 1 shows a prior art experiment in which a homogeneous gold layer is illuminated under SPP resonance conditions.
Figure 2:
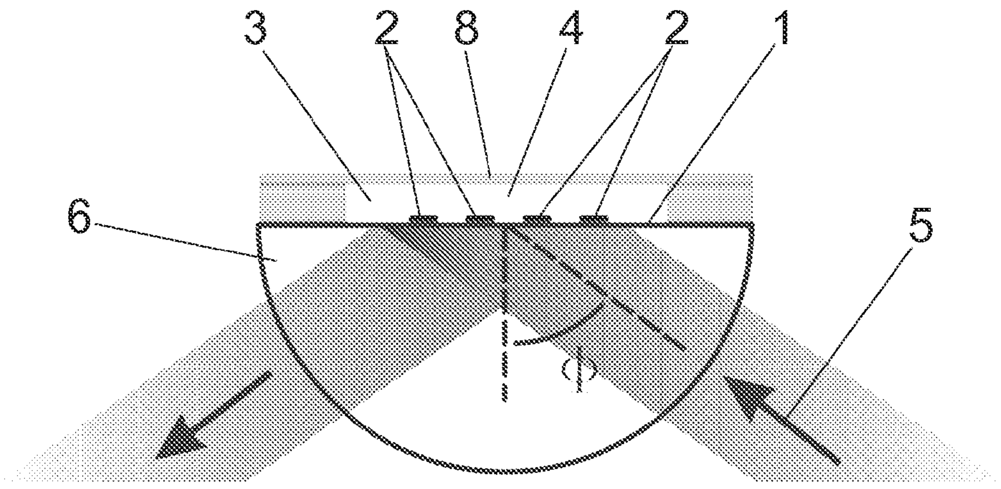
FIG. 2 shows a schematic of the optical configuration for carrying out the method according to an embodiment of the present invention.

FIG. 2 shows a schematic of the optical configuration for carrying out the method according to an embodiment of the present invention. FIG. 2 shows a transparent surface (1) which is decorated with a pattern (2). The transparent surface (1) is for example the surface of a glass substrate, but any other transparent surface can be used instead. The pattern (2) can be of any material capable of sustaining surface plasmons (SP), in particular surface plasmons polaritons (SPP), under certain conditions of illumination which will be explained later. Under those illumination conditions, surface plasmons (SP) arise at the interface between a dielectric and a medium with a negative dielectric function. Examples of materials capable of sustaining surface plasmons (SP) are metals, semiconductors or doped dielectrics. Examples of metals which the surface (1) can be decorated with are: gold, silver, copper, aluminium, etc. and mixtures thereof. However, these metals should not be interpreted in a limiting way. On the contrary, any other structure made of material capable of sustaining surface plasmons (SP) can be used instead.

The pattern (2) can be formed by a single structure or item, such as, for example, a stripe or a disk, without being limited to these particular structures. Alternatively, the pattern (2) can be formed by one or more arrays of items or structures, such as stripes, disks, square-sized items or triangle-sized items, but is not limited to these structures or items. The thickness of the items is preferably within the following range: approximately between 10 nm and 100 nm. The width and length of these items are in the order of the micrometers and will be specified later.

In a particular embodiment, the one or more items which form the pattern (2) are made of metal. In this particular embodiment, the metal items are fabricated with conventional e-beam lithography combined to a lift-off process, but any other conventional techniques known by a skilled person for fabricating metal structures or items can be alternatively used. In a more particular embodiment, these metal items are made of gold, and in an even more particular embodiment their thickness is approximately 40 nm.

When the items take the form of stripes, the dimensions of each stripe are preferably as follow: the length of each stripe is between around 10 μm and several millimeters; the width of each stripe is between around 1 μm and around 100 μm. When the items take the form of disks, the diameter of each disk is preferably between around 1 μm and around 100 μm. As already said before, the thickness of the items is preferably within the following range: approximately between 10 μm and 100 μm, for any kind of structure or item.

When the pattern (2) is formed by a plurality of items, such as stripes or disks, the items are preferably arranged in arrays. The items are then separated between each other (between the consecutive ones) by a distance which must be bigger than the wavelength (λ) of the incident optical beam (5), because under these circumstances each item behaves, from the optical point of view, as an individual structure or item, because for this distance the optical coupling is negligible. Then, the items are preferably separated between each other (between the consecutive ones) by a distance of between 1 μm and 100 μm, approximately. The items are most preferably separated between each other by a distance of about 20 μm. This distance enables to fully decouple the interaction (in the optical sense) between neighbour items. Therefore, in the optical sense, each of the items acts as an isolated item.

On top of the transparent surface (1), that is to say, in contact with the pattern (2) used to decorate the surface (1), a chamber (3) comprising a solution (4) of micrometer-sized objects is mounted or placed. For putting into practice the present invention, suitable micrometer-sized objects acting as solute of the solution (4) are any commercial monodisperse particles. Illustrative examples of suitable solutes are those recognized by an expert, such as mono-dispersed polystyrene (PS, n=1.59), melamine formaldehyde and silica ($SiO_2$), and more preferably mono dispersed polystyrene (PS).

Suitable solvents for the solution (4) are any solvent which has a refractive index (n) different from that of the solute. In a particular embodiment, an aqueous solution is chosen. In the context of the present invention, an aqueous solution comprises water and an effective amount of a surfactant. In the context of the present invention, an effective amount of a surfactant is an amount such that the solute (micrometer-sized objects) does not adhere either to the surface (1) or to the pattern (4). In a particular embodiment, an aqueous solution consists of water and an effective amount of a surfactant.

In a more particular embodiment, the solution (4) is chosen to be an aqueous solution of mono-dispersed polystyrene (PS, n=1.59) particles, such as spheres, wherein the particles have a diameter of a few micrometers.

The depth of the chamber (3) is between approximately 10μ and 100 μm. In a particular embodiment, this depth is about 20 μm. The chamber (3) is preferably closed by transparent closure means (8), in order to avoid evaporation of the solution, which in turn causes movements of the particles due to non-optical reasons.

An object forming part of a solution (4) approaching or in contact with a surface (2) in which Surface Plasmons Polaritons (SPP) can be excited, is subject, under certain conditions of illumination, to SPP forces resulting from the strong field enhancement at the pattern (2)/solution (4) interface. As said before, the pattern (2) is preferable a metal pattern. Conditions under which Surface Plasmons Polaritons (SPP) can be coupled with light depend on the materials defining the interface (in a particular example, metal-solution interface).

The embodiment represented in FIG. 2 is a preferred embodiment in which the Kreitchmann configuration has been considered. The Kreitchmann configuration comprises a transparent element (6), preferably a prism, through which a pattern (2) and a solution (4) are illuminated under total reflection conditions by a single linearly p polarized light beam (5). As said before, the pattern (2) can be formed by a single structure or item or by a plurality of structures or items. According to this preferred embodiment (Kreitchmann configuration), for a specific interface (pattern (2)-solution (4)) and a fixed wavelength, there is only one incident angle (Φ) under which the SPP can be excited. For the particular example in which the pattern is a metal, in particular gold, an the solution is an aqueous solution, and therefore the interface is a gold-water interface, and the wavelength of the incident light beam is of about 785 nm, the incident angle (Φ) is of about 71°. These are the conditions at which the surface plasmon polaritons are excited and therefore the micrometer-sized particles comprised in the solution (4) can be optically trapped by the structures or items which form the pattern (2). It is to be noted that using the current configuration, a significant field at the gold-water interface still exists when the incident angle (Φ) is different from the above-mentioned one (about 71°), but this field is very weak compared to the one created in the presence of SPP. Therefore, in that case, the optical trap is much weaker and consequently does not allow for maintaining the micrometer-sized particles stable.

According to the embodiment shown in FIG. 2, the surface (1) is illuminated under total internal reflection by a linearly p-polarized light beam (5) through a transparent element (6). Angle Φ in FIG. 2 represents the incident angle. As explained before, this angle Φ depends on the pattern-solution interface and on the wavelength of the incident light beam. FIG. 2 represents the preferred illumination configuration, the so-called Kreitchmann configuration, because this configuration has been proved as being the most efficient one in terms of the amount of energy which is able to couple to the plasmon mode and also the easiest to implement. However, this configuration is not the only one which enables coupling light to the Surface Plasmons Polaritons (SPP). Any other illumination configurations capable of coupling SPP can be used, such as the "end-fire" configuration and the "grating" configuration used for coupling light to optical waveguides. The transparent element (6) is preferably a glass element. This transparent element (6) can for example take the shape of a cylinder, a prism or a half-sphere, but any other conventional shape can be adopted by the transparent element (6). The selection of the wavelength (λ) of the light beam (5) depends on the pattern-solution interface and on the incident angle (Φ). Depending on the pattern-solution interface, the wavelength (λ) can be between 400 nm and several micrometers, preferably between 600 nm and 1 μm. In other words, for each specific interface pattern (2)-solution (4), there are a wavelength (λ) and an incident angle (Φ) which manage to excite the surface plasmons polaritons. As stated before, for the particular example in which the pattern is a metal, in particular gold, and the solution is an aqueous solution, and therefore the interface is a gold-water interface, and the incident angle (Φ) is of around 71°, the wavelength of the incident light beam is of about 785 nm.

The incident light beam (5) is provided by a light source, not illustrated in FIG. 2, which can be any optical source, such as a laser source. The diameter of the incident light beam (5) at the interface formed by the surface (1) decorated with the pattern (2) and the solution (4) is adjusted to about 300 μm. The power at the entrance of the transparent element (6) is chosen to be within the following range: from 100 mW to 1000 mW. This means that the required intensity at the surface (1) is lower than $10^7$ W/m$^2$. In a particular embodiment, the power at the entrance of the transparent element (6) is fixed at approximately 500 mW, corresponding to an intensity of I=5.5 $10^6$ W/m$^2$. This is about two orders of magnitude lower than the minimum intensity required in a conventional 3D optical trap (1 mW focussed into 1 μm$^2$ corresponds to an intensity of I=1.10$^9$ W/m$^2$).

After illuminating under the Kreitchmann configuration the surface (1) and the pattern (2), both in contact with the solution (4), for a certain time interval, the micrometer-sized particles comprised in the solution (4) are trapped in a controlled and stable way by the one or more structures forming the pattern (2).

Due to the fact that the separation between each of the items or structures which form the pattern (2) has been chosen such that each one of the items acts as an isolated item from the optical coupling point of view, each item acts as a single optical trap.

What is more, a pattern (2) can trap in parallel micrometer-sized particles comprised in the solution (4) under the illumination of a single light beam (5). That means that the method and system of the present invention allows a pattern (2) to act as a plurality of optical traps acting in parallel (simultaneously) under the illumination of a single optical beam (5).

Optionally, the characteristics of the optical trap, that is to say, of the items which form the pattern (4), can be optimized, depending on the circumstances, by a plurality of simultaneous optical beams that can act simultaneously to produce each of them an incident beam.

Furthermore, in objects comprised in a solution (4) with significantly different polarizability, the respective weight of the scattering and restoring forces is different. The SPP traps can thus be optimized to selectively trap a specific type of objects out of a mix of different objects.

Next, an experiment which was carried out by means of the configuration described in FIG. 2 is described:

First Experiment

Figure 3:
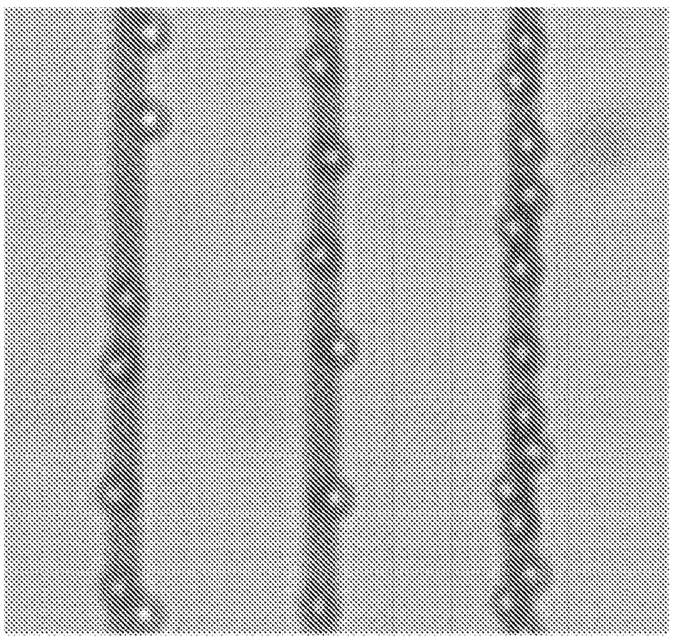
FIG. 3 shows an example carried out to illustrate the present invention.

In this experiment, a gold pattern was used as pattern (2). The transparent surface (1) was patterned with periodically arranged 4.8-μm-wide and 200 μm long gold stripes (2). The stripes were separated by a distance of about 20 μm. The solution (4) placed within the chamber (3) and in contact with the transparent surface (1) was an aqueous solution of mono-dispersed polystyrene (PS, n=1.59) spheres, the spheres having a diameter of about 4.88 μm. The concentration of the solution was 0.012% (in volume). It has been observed that the patterned gold surface reduced the thermal effects in comparison to homogeneous gold surfaces. Furthermore, the thermal effects became negligible below a certain gold density (from about 30% the thermal effect became negligible in the range of power considered). Observations made after about 15 minutes under laser illumination (λ of about 785 nm, Φ of about 71°) at SPP resonance showed unambiguously that the colloids or micrometer-sized objects arranged preferentially along the gold stripes. This is shown in FIG. 3, which shows the distribution of the 4.88 μm (diameter) polystyrene particles over a pattern formed by gold stripes (4.80 μm width) after 15 minutes under laser illumination at SPP resonance. For the gold density considered, long range movement of the micrometer-sized objects due to thermal effects was not perceptible so that most of the micrometer-sized objects which reached the stripes had been guided along the surface by the scattering force or were directly falling down on top of it. Contrary to what had been observed in experiments in which homogeneous metal surfaces had been used, the current experiment surprisingly showed a specific distribution (clearly influenced by the pattern) of the micrometer-sized objects with respect to the uncontrollable distribution in the case of an homogeneous gold surface.

Second Experiment

Figure 4:
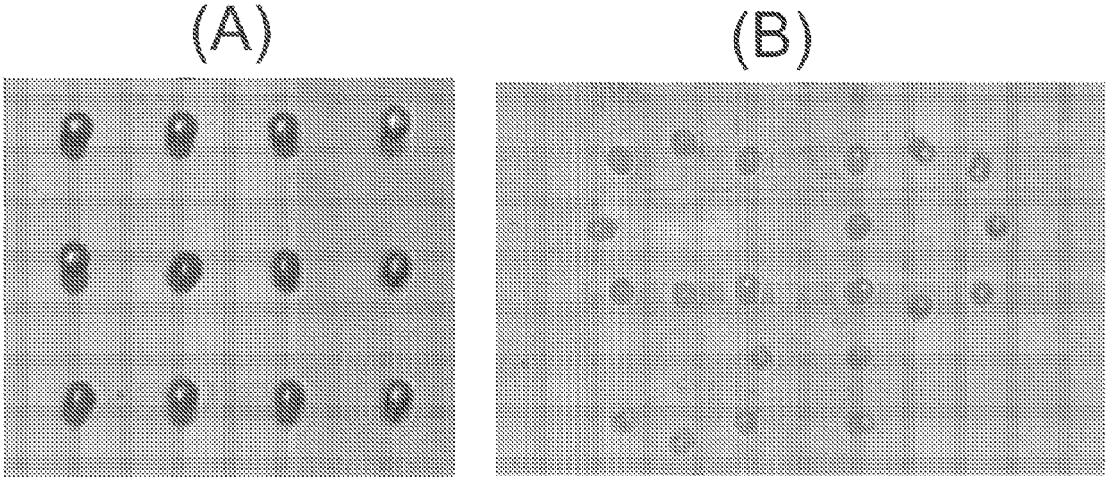
FIGS. 4A and 4B show another example carried out to illustrate the present invention.

Next, a second experiment which was carried out by means of the configuration described in FIG. 2 is explained. In this experiment, the transparent surface (1) was patterned (2) with micrometer-sized gold disks instead of with gold stripes. An array of 12 gold disks, each of the disks with a diameter of 4.8 μm was used. The disks were separated by a distance of about 20 μm. The solution (4) placed within the chamber (3) and in contact with the transparent substrate (1) was an aqueous solution of mono-dispersed polystyrene (PS, n=1.59) spheres (micrometer-sized objects) having a diameter of about 4.88 μm. The concentration of the solution was 0.012% (in volume). Observations were made after about 15 minutes under laser illumination (λ of about 785 nm, Φ of about 71°) at SPP resonance showed. For the considered array of 12 disks, all of them were occupied with a sole micrometer-sized object which remained fixed as long as the illumination was maintained. Under resonant illumination conditions, a gold area (gold disk) surrounded by bare glass created a trapping potential capable of grabbing and immobilizing one micrometer-sized particle. This means that the user controls totally the optical trap, because the shape and dimensions of the items forming the pattern (4) are selected according to the dimensions of the object which is to be trapped. This is shown in FIG. 4A, in which it can be seen that the polystyrene (PS) objects got trapped. FIG. 4A shows an array of 12 disks which acted as 12 optical traps. Since the dimension (diameter) of the disk was chosen to be similar to that of the micrometer-sized objects, each disk was able to trap one micrometer-sized object. FIG. 4B shows an experiment taken under identical conditions but in which the gold disks forming the pattern (2) were arranged in a different way. In this case, a gold area (gold disk) surrounded by bare glass created a trapping potential capable of grabbing and immobilizing one micrometer-sized particle. As can be seen in FIG. 4B, a pattern (2) of items taking the form of the letters “SP” (which stand for “surface plasmons”) had been selected to prove that the optical traps or trapping items can be absolutely controlled by the user, in such a way that the objects, once trapped, also form the letters “SP”. Indeed, the multi-fold enhanced surface field intensity at the gold surface is enough to compensate the Brownian motion of the particles, the asymmetrical illumination (scattering force) and the thermal movement. Therefore, the experiment whose result is shown in FIG. 4 clearly proves the controllable and stable organization of particles at the surface of the transparent surface (1). In the first experiment it was observed that micrometer-sized particles preferentially arranged along the stripes, contrary to what had been observed in the case of a homogeneous gold surface, wherein an uncontrolled distribution had been observed. This proves that control on one dimension (the width of the stripe) was achieved. In this second experiment it has been surprisingly observed that a single disk is able to trap an individual micrometer-sized particle, which implies a further step in stability, proving that a user can control and select individual objects by designing specific optical traps.

Afterwards, two more experiments were carried out in order to verify that the origin of the stable particle trapping derives from the presence of surface plasmons (SP):

Third Experiment

In the third experiment, the polarization of the incident laser was switched from "p" to "s", since no SP resonance is expected under only s-polarized light. Apart from the change in polarization, the experiment was similar to the second one: The transparent surface (1) was patterned (2) with an array of micrometer-sized gold disks, each of the disks with a diameter of 4.8 μm. The disks were separated by a distance of about 20 μm. The solution (4) placed within the chamber (3) and in contact with the transparent substrate (1) was an aqueous solution of mono-dispersed polystyrene (PS, n=1.59) spheres (micrometer-sized objects) having a diameter of about 4.88 μm. The concentration of the solution was 0.012% (in volume). Observations were made after about 15 minutes under laser illumination (λ of about 785 nm, Φ of about 71°). The change of polarization resulted in a decrease of the field intensity above the gold disks, which make the combination of the scattering force and the Brownian fluctuations to overcome the restoring forces. After a short time, the objects (spheres) got away from the gold area.

Fourth Experiment

In the fourth experiment, whose conditions were exactly the same ones as the second one except for the fact that the incident angle of light originated at the optical source was changed to a value which did not match the SPP resonance angle. p-polarization of light was maintained. A similar behaviour as the one of the previous experiment was observed.

Fifth Experiment

Figure 5:
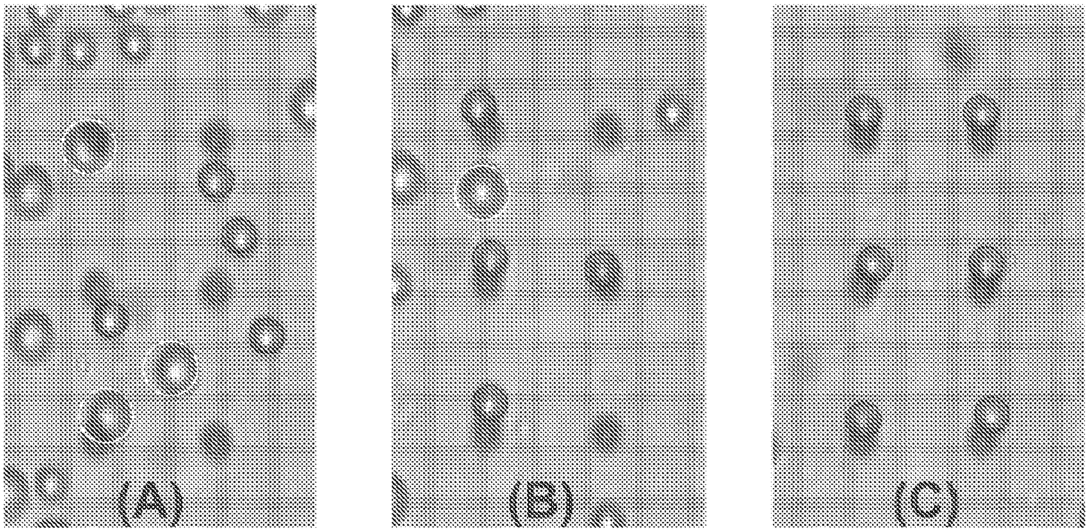
FIGS. 5A, 5B and 5C show another example carried out to illustrate the present invention.

Finally, a last experiment was carried out in order to observe the selectivity of optical traps due to SPP to different micrometer-sized objects with unequal polarizabilities (for instance, different sizes or refraction index for the micrometer-sized object lead to different polarizabilities). In micrometer-sized objects with significantly different polarizabilities, the respective weight of the scattering and restoring forces is different. The optical traps due to SPP can thus be optimized to selectively trap a specific type of objects (particles) out of a mix. To illustrate this aspect, the following experiment according to FIG. 2 was performed: a metal pattern (2) was formed by an array of 3.5 μm diameter gold disks. The solution (4) placed within the chamber (3) and in contact with the transparent surface (1) was an aqueous solution of mono-dispersed polystyrene (PS, n=1.59) spheres, the diameter of the spheres being: about 3.55 μm and about 4.88 μm, in approximately equal proportion. The concentration of the solution was 0.012%, that is to say, 0.006% for each type of micrometer-sized objects (spheres), in volume. FIG. 5 shows three successive pictures recorded above an array of 6 traps (6 disks) with an interval of 5 minutes in between them (FIG. 5A is taken after 5 minutes of illumination, FIG. 5B after 10 minutes and FIG. 5C,_after 15 minutes). As can be seen in FIG. 5C, after 15 minutes, while the two types of objects had similar probability to pass through the trap array without being trapped by the metal, only the objects of the smallest size (3.55 μm diameter) got trapped.

An optical manipulation method and an optical trap based on SPP at a patterned metal surface have been shown. This simple technique permits to arrange a large number of single small objects according to any predefined design using a simple extended and uniform illumination with moderate incident intensity. It has also been demonstrated that the SPP trap can be engineered (for example, by modifying the dimension of the gold pattern) to become selective to objects of different polarizabilities (for instance induced by different sizes, shapes, refraction index).

The optical traps of the present invention are especially useful as a tool for optically driven lab-on-a-chip.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method of optical manipulation of micrometer-sized objects, the method comprising the steps of:

(a) placing a pattern of a predetermined material on a surface, said pattern being formed by at least one item of said material, wherein said material is capable of sustaining surface plasmons;

(b) placing a solution comprising micrometer-sized objects in contact with said surface and said pattern;

(c) selecting a dimension of said at least one item forming the pattern according to a dimension of at least one object to be trapped;

(d) applying at least one optical beam at a predetermined wavelength and with a predetermined incident angle (Φ) to said surface for a predetermined time interval;

(e) creating surface plasmons forces at said surface;

(f) selectively and individually trapping said micrometer-sized objects in the pattern in a stable way according to a polarizability of said micrometer-sized objects.

2. Method according to claim 1, wherein said pattern (2) is formed by plurality of items of said material, each of said plurality of items being capable of trapping at least one respective micrometer-sized object in a stable way.

3. Method according to claim 1, wherein said pattern (2) is formed by at least one array of items of said material, each of the items of said at least one array of items being capable of trapping at least one micrometer-sized object in a stable way.

4. Method according to claim 3, wherein each of the items of said at least one array of items is separated between each other by a distance which is bigger than the wavelength of the incident optical beam.

5. Method according to claim 1, wherein said at least one optical beam (5) is a single non-focused light beam.

6. Method according to claim 1, wherein said surface plasmons are surface plasmons polaritons.

7. Method according to claim 1, wherein said material forming the pattern (2) is metal.

8. Method according to claim 2, wherein said at least on item forming the pattern (2) is of the shape of a stripe or of a disk.

9. Method according to claim 1, wherein said surface (1) is illuminated under total internal reflection through a transparent element (6).

10. Method according to claim 1, wherein said optical beam (5) has p-polarization.

11. Method according to claim 1, wherein the intensity at the surface (1) provided by the optical beam (5) is lower than $10^7$ W/m$^2$.

12. A system for optically manipulating micrometer-sized objects, the system comprising:

a surface on which a pattern of a predetermined material is placed, said pattern being formed by at least one item of said material, wherein said material is capable of sustaining surface plasmons, and wherein a dimension of said at least one item forming the pattern is selected according to a dimension of at least one object to be trapped;

a solution comprising micrometer-sized objects, said solution being in contact with said surface and said pattern;

an optical source capable of emitting at least one optical beam at a predetermined wavelength and with a predetermined incident angle (Φ) towards said surface, said optical beam being capable of illuminating said surface, pattern and solution for a predetermined time interval, thereby creating surface plasmons forces at said surface, wherein said micrometer-sized objects are selectively trapped by said at least one item which forms the pattern in a stable way; said selective and individual trapping being done according to a polarizability of said micrometer-sized object.

13. System according to claim 12, further comprising a chamber (3) in which said solution (4) is kept.

14. System according to claim 12, further comprising a transparent element (6) through which said surface (1), pattern (2) and solution (4) are illuminated.

15. System according to claim 14, wherein said surface (1), pattern (2) and solution (4) are illuminated through said transparent element (6) under total internal reflection.

16. System according to claim 12, wherein said pattern (2) is formed by at least one array of items of said material, each of the items of said at least one array on items being capable of trapping at least one micrometer-sized object in a stable way.

17. System according to claim 16, wherein each of the items of said at least one array of items is separated between each other by a distance which is bigger than the wavelength of the incident optical beam.

18. System according to claim 16, wherein said material forming the pattern (2) is metal.

19. System according to claim 13, wherein said at least one item forming the pattern (2) is of the shape of a stripe or of a disk.

20. System according to claim 12, wherein said surface plasmons are surface plasmons polaritons.

21. System according to claim 12, wherein the intensity at the surface (1) provided by the optical beam (5) is lower than $10^7$ W/m$^2$.

22. An optical trap for trapping micrometer-sized objects, the trap comprising:

a pattern of a predetermined material placed on a surface, said pattern being formed by at least one item of said material, wherein a dimensions of said at least one item forming the pattern is selected according to a dimension of at least one object to be trapped;

said at least one item being capable of trapping in a stable and selective way at least one micrometer-sized object comprised in a solution, said selective and individual trapping being done according to a polarizability of said micrometer-sized objects, said solution is in contact with said pattern and said surface, wherein the surface plasmon forces are created on said surface as a result of an optical beam illuminating said pattern and said surface.

23. A method of using an optical trap, the method comprising the steps of:

(a) placing a pattern of a predetermined material on a surface, wherein said pattern is formed by at least one item of said material, said at least one item being capable of trapping in a stable and selective way at least one micrometer-sized object comprised in a solution;

(b) placing a solution comprising the at least one micrometer-sized object in contact with said surface and said pattern;

(c) selecting a dimension of said at least one item forming the pattern according to a dimension of at least one object to be trapped;

(d) creating surface plasmon forces on said surface as a result of an optical beam illuminating said pattern and said surface;

(e) selectively and individually trapping said micrometer-sized objects in a stable way using the pattern according to a polarizability of said micrometer-sized objects;

(f) operating an optically driven lab-on-a-chip.

* * * * *